No. 11,854. Reissued Sept. 11, 1900.

T. FERGUSON & G. B. BRACE.

GATE.

(Application filed July 5, 1900.)

Witnesses.

John C. Herald.

M. H. Burton

Inventors

Thomas Ferguson and

George Bannister Brace

By J. M. S. John,

Atty.

THE NORRIS PETERS CO., PHOTO-LITHO., WASHINGTON, D. C.

UNITED STATES PATENT OFFICE.

THOMAS FERGUSON, OF PARKERSBURG, AND GEORGE BANNISTER BRACE, OF CEDAR FALLS, IOWA; SAID FERGUSON ASSIGNOR TO SAID BRACE.

GATE.

SPECIFICATION forming part of Reissued Letters Patent No. 11,854, dated September 11, 1900.

Original No. 639,547, dated December 19, 1899. Application for reissue filed July 5, 1900. Serial No. 22,646.

*To all whom it may concern:*

Be it known that we, THOMAS FERGUSON, residing at Parkersburg, in the county of Butler, (post-office address the same,) and GEORGE BANNISTER BRACE, residing at Cedar Falls, in the county of Black Hawk, (post-office address the same,) State of Iowa, citizens of the United States, have invented certain new and useful Improvements in Gates; and we do hereby declare the following to be a full, clear, and exact description of the invention, such as will enable others skilled in the art to which it appertains to make and use the same.

This invention relates to gates, and more particularly to that class known in the art as "wire gates."

The object of the invention is to provide a gate of this character which shall be simple in construction, durable in use, comparatively inexpensive of production, and one which in opening and closing may be elevated to swing over obstructions and which when closed may be tilted or adjusted vertically to permit fowls and small animals to pass under the same.

With this object in view our invention consists in certain features of construction and combination of parts, which will be hereinafter more fully described and claimed.

Figure 1:
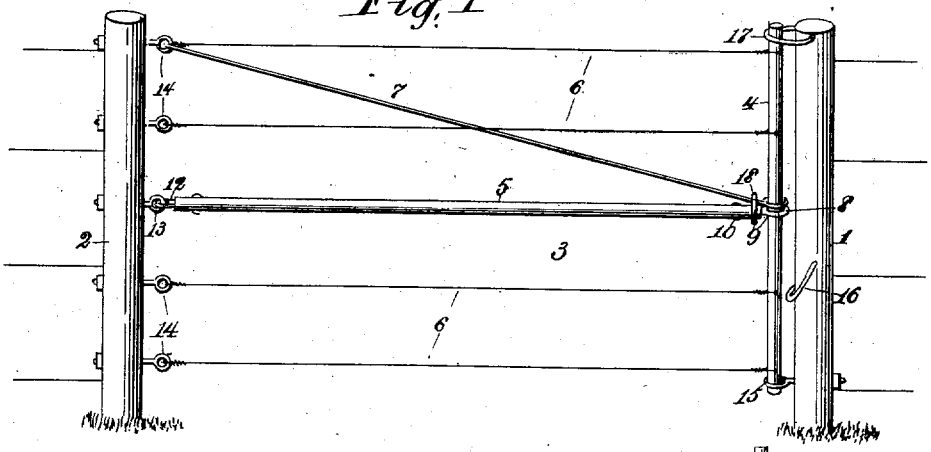
Figure 2:
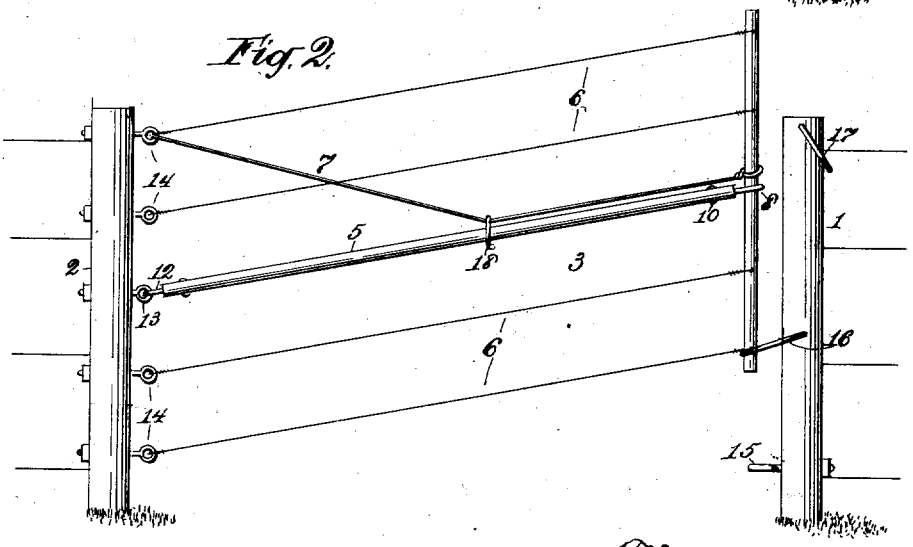
Figure 3:
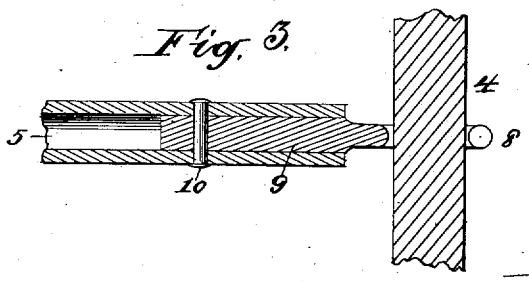

In the accompanying drawings, Figure 1 is a side elevation of a gate embodying our invention, the gate being shown closed. Fig. 2 is a similar view with the gate elevated or adjusted vertically. Fig. 3 is a longitudinal section of one end of the strut and its connected upright, showing the manner of securing the eyebolt in position.

In the drawings, 1 and 2 denote the fence-posts, between which the gate is mounted. The gate 3 comprises an upright 4, a strut 5, pivotally connected thereto, two or more tie-strands 6, disposed on each side of said strut and preferably parallel therewith, and a diagonal guy or truss 7. The ends of the strut, tie-strands, and guy opposite the upright have a flexible connection mediately or directly with the post 2, whereby the gate may be opened and closed in the usual way. In practice the upright and strut are preferably tubular and are connected by a joint 8, the shank 9 of which enters the end of the strut and is secured by a rivet 10. A simple connection of the strut with the post 2 is shown, comprising a pair of eyebolts 12 and 13, the former of which is secured to the strut in the same manner as the eyebolt 8, and the other is suitably secured to the post. The tie-strands 6 are preferably wires, at one end passing through the upright 4 and secured thereto as by twisting the parts of the wire together. The connections of the other ends of the wires may be screw-eyes or bolts 14, so that the wires may be drawn taut when in position. The gate is prevented from sagging by a diagonal guy or truss 7, one end of which connects with the upright and the other end mediately or directly with the post 2. The guy may be a wire or small cable. An eyebolt 15 is attached to the post 1 and serves as a support for the upright 4 when in normal closed position. A loop 16 some distance above the foot serves to hold the lower end of the upright when in a closed but elevated position, as shown in Fig. 2. A similar loop or ring 17 near the upper end of the post 1 serves to hold the upper end of the upright when the gate is closed and in normal position. When in such position, the lower end of the upright rests securely in the eyebolt 15. The guy is of flexible material, and by deflecting it, as shown in Fig. 2, the free end of the gate is elevated. A simple device for effecting this result is a ring 18, embracing both the guy and the strut, and by sliding the ring along the strut the free end of the gate may be elevated or depressed at will. This characteristic—namely, the elevation and depression of one end of the gate by the flexure of a diagonal strut—we regard as the most novel and important feature of the invention.

Having thus fully described our invention, what we claim as new, and desire to secure by Letters Patent, is—

1. In a gate, the combination of a post, an upright, a strut having a hinged connection with each, one or more tie-strands connecting the post and upright each side of the strut, a diagonal guy connecting the post and upright, and means for deflecting the same, whereby one end of the gate may be elevated or depressed.

2. In a gate, the combination of a post, an upright, a strut hinged to each, one or more tie-strands connecting the post and upright each side of the strut, a diagonal guy connecting with the post and upright, and a ring embracing the strut and guy, whereby the guy may be deflected by the sliding of said ring along the strut, and one end of the gate elevated or depressed.

3. In a gate, the combination of a post, an upright, a strut hinged to each, a series of parallel tie-strands arranged each side of said strut and connecting with the post and upright, means substantially as described for straining said tie-strands, a flexible guy connecting diagonally with the post and upright, and means for deflecting the same, substantially as and for the purpose set forth.

4. In a gate, the combination of an upright, a pair of posts, a strut hinged to the upright and one of said posts, a series of parallel tie-strands each side of said strut connecting with said upright and last-mentioned post, a diagonal, flexible guy connecting with the same post and upright, means for deflecting the same to tilt the gate, a foot to hold the lower end of the upright when in closed position, and means substantially as described for securing the upper end of said post when in the same position.

5. The combination with a gate substantially as described, comprising a terminal post and upright, a longitudinal strut hinged to each, a series of parallel tie-strands, a diagonal guy and means for deflecting the same to tilt the gate, of a post provided with a foot to support the lower end of the upright when in normal, closed position, a loop to support the same in an elevated position, and means for securing the upper end of the upright when in normal, closed position, substantially as described.

In testimony whereof we affix our signatures in the presence of two witnesses.

THOMAS FERGUSON.
GEORGE BANNISTER BRACE.

Witnesses:
S. R. BIRD,
S. L. CAMP.